(12) United States Patent
Iizuka et al.

(10) Patent No.: US 10,648,511 B2
(45) Date of Patent: May 12, 2020

(54) SEAL STRUCTURE AND TURBOCHARGER

(71) Applicant: IHI Corporation, Koto-ku (JP)

(72) Inventors: Kuniaki Iizuka, Koto-ku (JP); Takashi Yoshida, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/300,690

(22) PCT Filed: Jul. 12, 2017

(86) PCT No.: PCT/JP2017/025421
§ 371 (c)(1),
(2) Date: Nov. 12, 2018

(87) PCT Pub. No.: WO2018/012540
PCT Pub. Date: Jan. 18, 2018

(65) Prior Publication Data
US 2019/0178292 A1    Jun. 13, 2019

(30) Foreign Application Priority Data

Jul. 15, 2016    (JP) .................................. 2016-140565

(51) Int. Cl.
*F16C 33/80*    (2006.01)
*F04D 29/12*    (2006.01)
(Continued)

(52) U.S. Cl.
CPC ............. *F16C 33/80* (2013.01); *F01D 25/183* (2013.01); *F02B 33/40* (2013.01); *F02B 39/00* (2013.01);
(Continued)

(58) Field of Classification Search
CPC .......... F16C 19/06; F16C 19/16; F16C 33/80; F16C 33/66; F16C 33/6607;
(Continued)

(56) References Cited

U.S. PATENT DOCUMENTS 2,729,476 A * 1/1956 Duggan ............... F16J 15/3204
                                                    277/576
5,174,733 A * 12/1992 Yoshikawa ............... F01D 5/02
                                                    416/241 B
(Continued)

FOREIGN PATENT DOCUMENTS

CN    202100522 U    1/2012
CN    104755721 A    7/2015
(Continued)

OTHER PUBLICATIONS

International Search Report dated Oct. 10, 2017 in PCT/JP2017/025421, 2 pages.
(Continued)

*Primary Examiner* — Marcus Charles
(74) *Attorney, Agent, or Firm* — Oblon, McClelland, Maier & Neustadt, L.L.P.

(57) ABSTRACT

A seal structure includes a rotary shaft that is provided inside a housing, a metal-made surrounding portion of the housing that surrounds the rotary shaft in a radial direction of the rotary shaft, and a resin-made seal member that faces an inner circumferential surface of the surrounding portion and rotates together with the rotary shaft.

8 Claims, 4 Drawing Sheets

(51) Int. Cl.
| | |
|---|---|
| F16C 19/16 | (2006.01) |
| F16C 33/66 | (2006.01) |
| F16J 15/447 | (2006.01) |
| F02C 6/12 | (2006.01) |
| F02B 33/40 | (2006.01) |
| F04D 29/10 | (2006.01) |
| F16C 19/06 | (2006.01) |
| F02B 39/00 | (2006.01) |
| F02B 39/14 | (2006.01) |
| F01D 25/18 | (2006.01) |

(52) U.S. Cl.
CPC ............. *F02B 39/14* (2013.01); *F02C 6/12* (2013.01); *F04D 29/10* (2013.01); *F04D 29/12* (2013.01); *F04D 29/122* (2013.01); *F16C 19/06* (2013.01); *F16C 19/16* (2013.01); *F16C 33/66* (2013.01); *F16C 33/6607* (2013.01); *F16J 15/447* (2013.01); *F16J 15/4472* (2013.01); *F05D 2220/40* (2013.01); *F05D 2240/55* (2013.01); *F16C 2208/20* (2013.01); *F16C 2360/24* (2013.01)

(58) Field of Classification Search
CPC .............. F16C 2220/40; F16C 2208/20; F16C 2208/80; F16C 2360/24; F02B 33/40; F02B 39/00; F02B 39/14; F02C 6/12; F04D 29/10; F04D 29/12; F04D 29/122; F04D 29/059; F01D 25/183; F16J 15/16; F16J 15/3204; F16J 15/447; F16J 15/4472; F05D 2220/40; F05D 2240/55; F05D 2240/54
USPC ..... 384/462, 477, 480, 482, 486; 415/170.1, 415/229; 277/572, 582, 590
See application file for complete search history.

(56) References Cited

U.S. PATENT DOCUMENTS

| | | | | |
|---|---|---|---|---|
| 2013/0156552 A1* | 6/2013 | Barlog | ................. | F16C 19/543 415/170.1 |
| 2014/0064938 A1 | 3/2014 | Eriksen et al. | | |
| 2014/0144412 A1* | 5/2014 | An | ................. | F02B 39/10 123/562 |
| 2014/0232070 A1 | 8/2014 | Takigahira et al. | | |
| 2015/0292562 A1 | 10/2015 | Maeda | | |
| 2015/0329170 A1* | 11/2015 | Kondo | ................. | B62M 3/003 74/594.1 |
| 2015/0345373 A1 | 12/2015 | Knight | | |
| 2017/0292405 A1* | 10/2017 | Isogai | ................. | F16C 33/6685 |
| 2017/0306761 A1* | 10/2017 | Okabe | ................. | F02B 39/00 |

FOREIGN PATENT DOCUMENTS

| | | | | |
|---|---|---|---|---|
| CN | 205315709 U | | 6/2016 | |
| DE | 102014216501 A1 | * | 2/2016 | ............... F16J 15/16 |
| EP | 1387061 A2 | * | 2/2004 | ............ F01D 25/186 |
| JP | 63-4338 U | | 1/1988 | |
| JP | 63-129774 U | | 8/1988 | |
| JP | 03235034 A | * | 10/1991 | ............ G01M 19/00 |
| JP | 6-307250 A | | 11/1994 | |
| JP | 11-62600 A | | 3/1999 | |
| JP | 2002-228013 A | | 8/2002 | |
| JP | 2002242937 A | * | 8/2002 | ............ F16C 19/163 |
| JP | 2003-83342 A | | 3/2003 | |
| JP | 2006-22791 A | | 1/2006 | |
| JP | 2006071058 A | * | 3/2006 | ............... F16J 15/16 |
| JP | 2008-190361 | | 8/2008 | |
| JP | 2009-174466 A | | 8/2009 | |
| JP | 2009-281182 A | | 12/2009 | |
| JP | 2013-24041 A | | 2/2013 | |
| JP | 2015-531444 A | | 11/2015 | |
| JP | 2015-537162 A | | 12/2015 | |
| JP | 2016-98756 A | | 5/2016 | |
| JP | 2017190811 A | * | 10/2017 | |
| JP | 2017190868 A | * | 10/2017 | |
| WO | WO 2013/001935 A1 | | 1/2013 | |
| WO | WO 2014/096786 A1 | | 6/2014 | |

OTHER PUBLICATIONS

"Mechanical Equipment Lubrication", Xi'an Jiaotong University Press, 2016, 6 pages (with English translation).

* cited by examiner

SEAL STRUCTURE AND TURBOCHARGER

CROSS REFERENCE TO RELATED APPLICATIONS

The present application is based upon and claims benefit of the priority from Japanese Patent Application No. 2016-140565, filed on Jul. 15, 2016, which is incorporated herein by reference in its entirety.

TECHNICAL FIELD

The present disclosure relates to a seal structure and a turbocharger.

BACKGROUND ART

As disclosed in Patent Literature 1, a turbocharger (electric supercharger) including an electric drive device is known. The drive device has a motor and rotates a shaft and a compressor impeller together. The shaft is supported by a bearing assembly. A labyrinth seal is provided on a rear surface side of the compressor impeller. The labyrinth seal includes a concentric ring bulged in three steps. This concentric ring meshes with a ring formed on a rear surface portion of the compressor impeller. These form a meandering passage (labyrinth) without being in contact with each other.

CITATION LIST

Patent Literature

Patent Literature 1: PCT Japanese Translation Patent Publication No. 2015-537162

SUMMARY OF INVENTION

Technical Problem

In a seal structure disclosed in Patent Literature 1, due to a part which meshes with a labyrinth seal and is formed in a rear surface portion of a compressor impeller, a range for providing the seal structure tends to increase. Such a complicated seal structure is not efficient in an aspect of workability. In addition, instead of the labyrinth seal as described above, it is possible to consider a structure in which a seal ring is provided between a rotary shaft and a housing. Generally, a seal ring is fitted into an annular attachment groove. However, a gap (clearance) is located or an abutment joining portion is located between a seal ring and an attachment groove in an axial direction or a radial direction of the rotary shaft. Gas may leak through these parts. Thus, when a seal ring is used, it is difficult to achieve favorable sealing properties.

The present disclosure describes a seal structure and a turbocharger, which has a simple configuration and in which sealing properties around a rotary shaft can be improved.

Solution to Problem

According to an aspect of the present disclosure, there is provided a seal structure including a rotary shaft that is provided inside a housing, a metal-made surrounding portion of the housing that surrounds the rotary shaft in a radial direction of the rotary shaft, and a resin-made seal member that faces an inner circumferential surface of the surrounding portion and rotates together with the rotary shaft.

Effects of Invention

According to the aspect of the present disclosure, sealing properties around the rotary shaft can be improved due to the simple configuration in which the resin-made seal member is applied to the metal-made surrounding portion.

DESCRIPTION OF EMBODIMENTS

Figure 1:
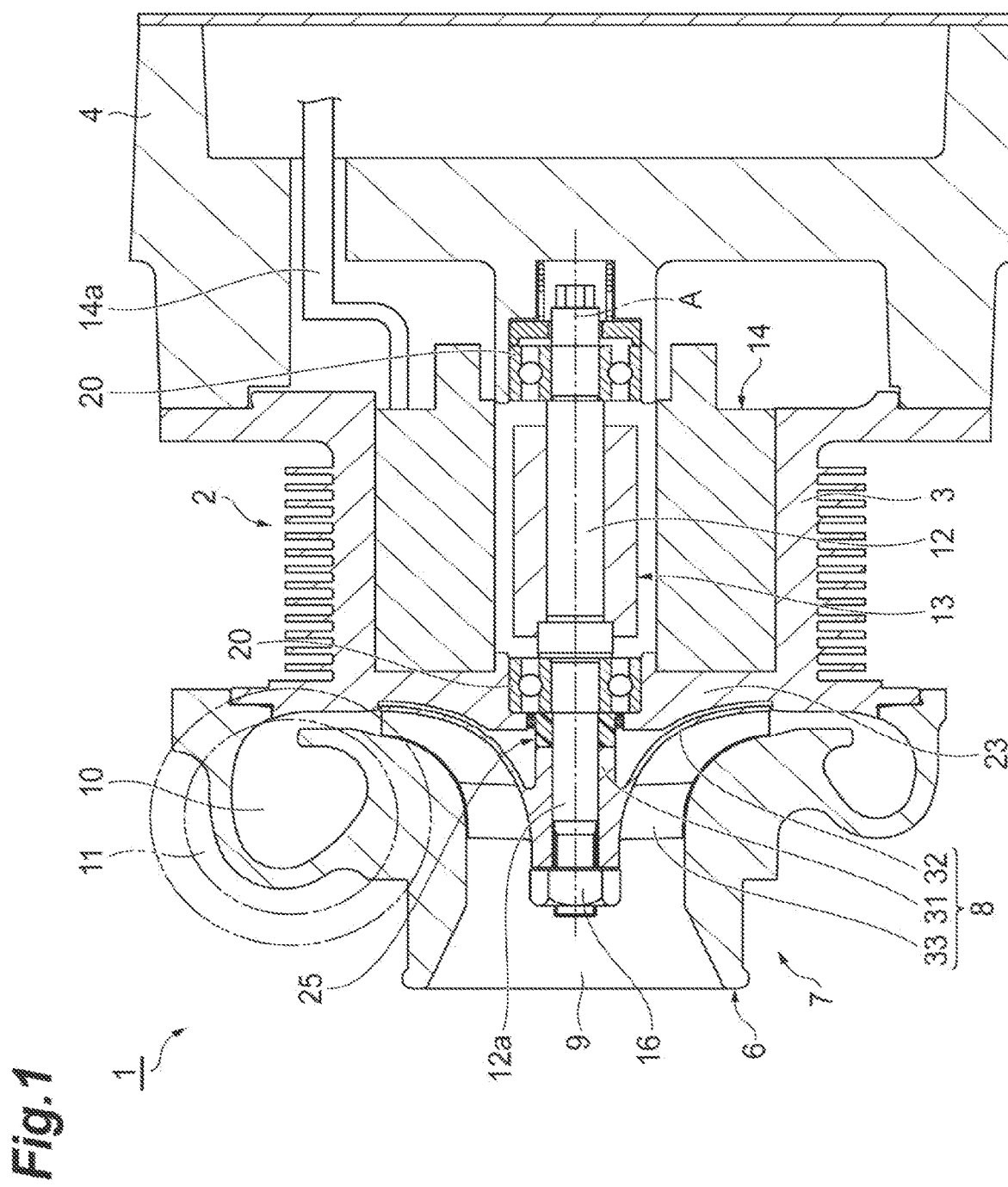
FIG. 1 is a cross-sectional view illustrating a turbocharger according to an embodiment of the present disclosure.

According to an aspect of the present disclosure, a seal structure includes a rotary shaft that is provided inside a housing, a metal-made surrounding portion of the housing that surrounds the rotary shaft in a radial direction of the rotary shaft, and a resin-made seal member that faces an inner circumferential surface of the surrounding portion and rotates together with the rotary shaft.

According to this seal structure, the seal member is provided between the surrounding portion of the housing and the rotary shaft.

This seal member faces the inner circumferential surface of the surrounding portion. When the rotary shaft rotates, the seal member rotates together with the rotary shaft. When eccentricity or the like is generated in the rotary shaft, an outer circumferential portion of the seal member and the surrounding portion of the housing may come into contact with each other due to the influence thereof. In such a case, since the surrounding portion is made of a metal and the seal member is made of a resin, the seal member is easily chipped off. As a result, a bare minimum clearance may be formed between the seal member and the surrounding portion. Therefore, sealing properties around the rotary shaft can be improved due to the simple configuration in which the resin-made seal member is applied to the metal-made surrounding portion.

In some aspects, the seal member includes a plurality of tonic portions protruding toward the surrounding portion, and a groove portion is provided between the tonic portions. According to this configuration, when the rotary shaft rotates, due to the influence of eccentricity or the like, distal ends of the toric portions and the surrounding portion of the housing may come into contact with each other. The distal ends of the resin-made tonic portions may be easily chipped off, and a bare minimum clearance may be formed between the tonic portions and the surrounding portion. Accordingly, sealing properties can be improved. Moreover, since a labyrinth structure is constituted of the tonic portions and the groove portion, sealing properties are further improved.

According to another aspect of the present disclosure, a turbocharger includes the housing that includes the surrounding portion, a compressor impeller that is attached to the rotary shaft, and the seal structure according to any one of those described above provided on a rear surface side of the compressor impeller inside the housing. According to the turbocharger including the seal structure described above, leakage of gas on the rear surface side of the compressor impeller along the rotary shaft can be minimized.

In some aspects, the compressor impeller is made of a resin and includes a boss portion which extends to the rear surface side of the compressor impeller and abuts the seal member. According to this configuration, since the compressor impeller is also made of a resin, even when the seal member receives a pressure from the boss portion of the compressor impeller in an axial direction, deformation of the seal member can be alleviated.

In some aspects, the compressor impeller is made of a resin and includes a boss portion which extends to the rear surface side of the compressor impeller and is integrated with the seal member.

In some aspects, the turbocharger includes a grease-lubricated bearing that is provided on the rear surface side of the compressor impeller of the seal member.

According to another aspect of the present disclosure, a seal structure includes a rotary shaft that is provided inside a housing, a surrounding portion of the housing that surrounds the rotary shaft in a radial direction of the rotary shaft, and a resin-made seal member that is attached to an inner circumferential surface of the surrounding portion and faces the rotary shaft or a cylindrical portion rotating together with the rotary shaft.

According to this seal structure, the seal member is provided between the surrounding portion of the housing and the rotary shaft. This seal member faces the rotary shaft or the cylindrical portion. When the rotary shaft rotates, the inner circumferential portion of the seal member may come into contact with the rotary shaft or the cylindrical portion. When eccentricity or the like is generated in the rotary shaft, the inner circumferential portion of the seal member is chipped off due to the influence thereof. As a result, a bare minimum clearance may be formed between the seal member and the rotary shaft or the cylindrical portion. Therefore, sealing properties around the rotary shaft can be improved due to the simple configuration in which the resin-made seal member is attached to the surrounding portion.

Hereinafter, embodiments of the present disclosure will be described with reference to the drawings. In description of the drawings, the same reference signs are applied to the same elements, and duplicated description thereof will be omitted.

With reference to FIG. 1, a seal structure according to the embodiment and a turbocharger to which the seal structure is applied will be described. In this embodiment, a case in which the seal structure is applied to an electric turbocharger will be described. As illustrated in FIG. 1, for example, an electric turbocharger 1 is a turbocharger that is applied to an internal-combustion engine for vehicles and watercrafts. The electric turbocharger 1 includes a compressor 7. In the electric turbocharger 1, a compressor impeller 8 rotates due to interaction between a rotor portion 13 and a stator portion 14, and a fluid such as air is compressed, thereby generating compressed air.

The electric turbocharger 1 includes a rotary shaft 12 which is rotatably supported inside a housing 2, and the compressor impeller 8 which is attached to a distal end portion 12a of the rotary shaft 12. The housing 2 includes a motor housing 3 which accommodates the rotor portion 13 and the stator portion 14, and a base housing 4 which blocks an opening on the other end side (right side in the diagram) of the motor housing 3. A compressor housing 6 accommodating the compressor impeller 8 is provided on one end side (left side in the diagram) of the motor housing 3. The compressor housing 6 includes an intake port 9, a scroll portion 10, and a discharge port 11.

The rotor portion 13 is fixed to a central portion of the rotary shaft 12 in the axial direction and includes one or a plurality of permanent magnets (not illustrated) attached to the rotary shaft 12. The stator portion 14 is fixed to an inner surface of the motor housing 3 such that the rotor portion 13 is surrounded. The stator portion 14 includes a coil portion (not illustrated) realized by winding a lead wire 14a therearound. When an AC current flows in the coil portion of the stator portion 14 through the lead wire 14a, the rotary shaft 12 and the compressor impeller 8 integrally rotate due to interaction between the rotor portion 13 and the stator portion 14. When the compressor impeller 8 rotates, the compressor impeller 8 takes outside air in through the intake port 9, compresses air through the scroll portion 10, and discharges the compressed air from the discharge port 11. The compressed air discharged from the discharge port 11 is supplied to the aforementioned internal-combustion engine.

The compressor impeller 8 includes a cylindrical boss portion 31 which is disposed around a rotary shaft line A of the rotary shaft 12 and is penetrated by the rotary shaft 12, a hub portion 32 which is connected to the boss portion 31 and extends in the radial direction of the rotary shaft 12 (rotary shaft line A), and a blade portion 33 which protrudes to one end side (left side in the diagram) in the radial direction and the rotary shaft line A direction from the boss portion 31 and the hub portion 32. The compressor impeller 8 is made of a resin, for example. The compressor impeller 8 may be formed of a polyphenylene sulfide (PPS) resin or may be formed of a polyether ether ketone (PEEK) resin, for example. The compressor impeller 8 may also be made of a carbon fiber reinforced plastic (CFRP).

Figure 2:
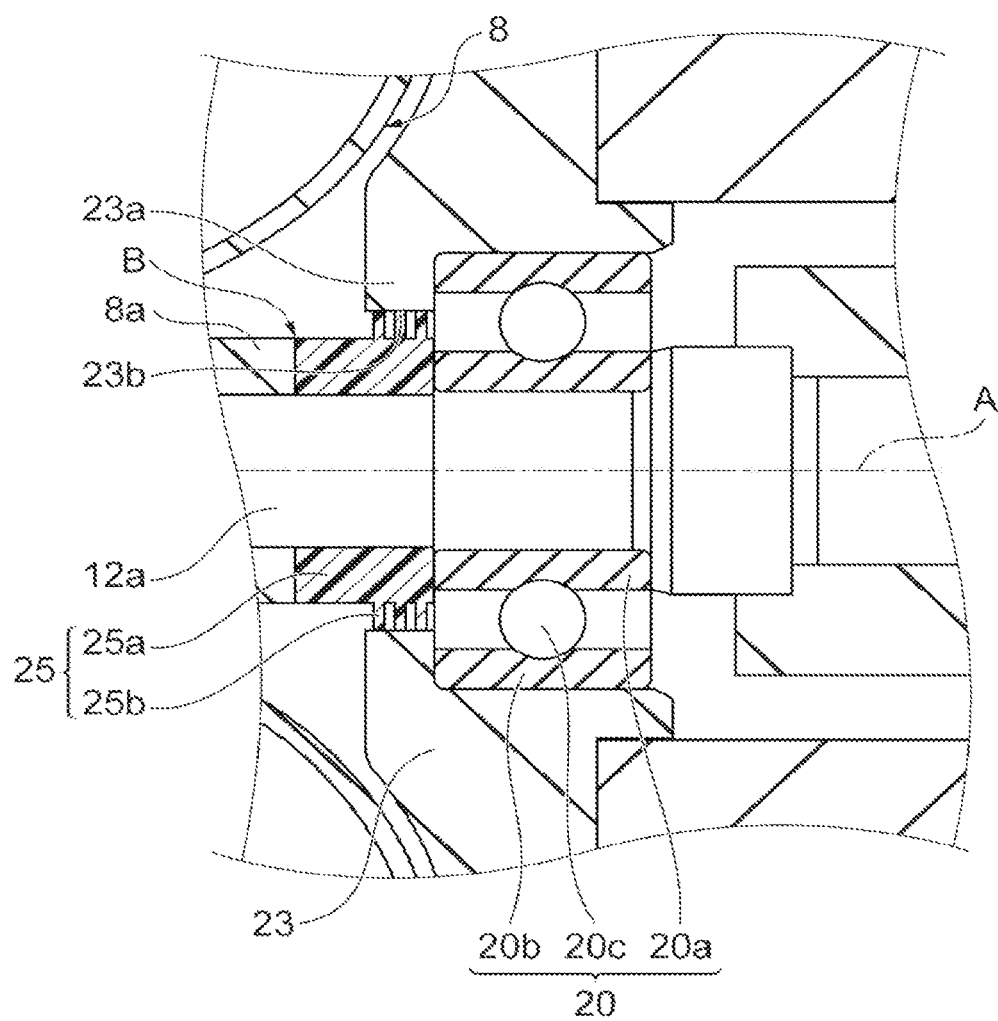
FIG. 2 is a cross-sectional view illustrating a seal structure in the vicinity of a rear surface side of a compressor impeller in FIG. 1.

The electric turbocharger 1 includes two bearings 20 which are press-fitted into the rotary shaft 12 and rotatably support the rotary shaft 12 with respect to the housing 2. The bearings 20 are respectively provided in the vicinity of the distal end portion 12a and in the vicinity of a proximal end portion of the rotary shaft 12 and support the rotary shaft 12 from both sides. For example, the bearings 20 are grease-lubricated radial ball bearing. The bearings 20 may be deep groove ball bearings or may be angular ball bearings. As illustrated in FIG. 2, the bearings 20 include an inner ring 20a which is press-fitted into the rotary shaft 12, and an outer ring 20b which is relatively rotatable with respect to the inner ring 20a with a plurality of balls 20c therebetween.

The rotary shaft 12 provided inside the housing 2 is supported by the two bearings 20 and is rotatable about the linear rotary shaft line A. For example, this rotary shaft 12 sometimes rotates in a bent state with respect to the rotary shaft line A due to eccentricity or the like. This eccentric state may vary in each electric turbocharger 1. There may be cases in which some electric turbochargers 1 barely have eccentricity. Even when there is eccentricity, the direction or the degree of the eccentricity in a circumferential direction of the rotary shaft 12 in each electric turbocharger 1 may vary. The seal structure of the present embodiment is devised to improve sealing properties around the rotary shaft 12 regardless of the eccentric state of the electric turbocharger 1.

Hereinafter, the seal structure of the present embodiment will be described in detail. One bearing 20 is attached to the rear surface side (right side in the diagram) of the compressor impeller 8. The motor housing 3 of the housing 2 is made of a metal, and for example, the motor housing 3 thereof is made of aluminum. The motor housing 3 includes the bearings 20, that is, a wall portion 23 protruding toward the rotary shaft 12, on the rear surface side of the compressor impeller 8. The rotary shaft 12 is inserted through the opening which is formed in the middle of the disk-shaped wall portion 23, and the bearings 20 are disposed in the opening. The inner circumferential portion of the wall portion 23 surrounds the outer ring 20b of the bearings 20. The outer ring 20b is fitted into the inner circumferential portion of the wall portion 23. The fitting relationship between the outer circumferential portion of the outer ring 20b and the inner circumferential portion of the wall portion 23 may be gap fitting, intermediate fitting, tight fitting, or arbitrary fitting.

As illustrated in FIG. 2, the motor housing 3 includes an annular surrounding portion 23a which protrudes to the compressor impeller 8 side beyond the bearings 20. The surrounding portion 23a is formed on the compressor impeller 8 side of the wall portion 23. The surrounding portion 23a faces the rotary shaft 12 in the radial direction of the rotary shaft 12. An inner circumferential surface 23b of the surrounding portion 23a is a cylindrical surface formed about the rotary shaft line A. In other words, the distance (radius) between the inner circumferential surface 23b of the surrounding portion 23a and the rotary shaft line A is uniform.

As described above, the surrounding portion 23a faces the rotary shaft 12. The surrounding portion 23a surrounds a part (a part close to the inner ring 20a) of the rotary shaft 12. The surrounding portion 23a protrudes to the rotary shaft line A side (inner side in the radial direction) beyond the outer ring 20b of the bearings 20. For example, due to pressurization of a pressurizing member (coil spring in FIG. 1) provided outside the bearings 20 on the base housing 4 side, an end surface of the outer ring 20b is in press-contact with this protruding part from one side in the rotary shaft line A direction. However, without being limited thereto, the end surface of the outer ring 20b may be held inside the housing without abutting or coming into press-contact with the protruding part of the surrounding portion 23a. The surrounding portion 23a ends in a region between the outer ring 20b and the inner ring 20a in the radial direction and does not reach the position of the inner ring 20a.

As illustrated in FIGS. 1 and 2, the compressor impeller 8 includes the boss portion 31 extending to the rear surface side of the compressor impeller 8. A cylindrical seal member 25 is provided between the bearings 20 and a proximal end portion 8a which is an end portion of the boss portion 31 on the rotor portion 13 side. The seal member 25 annularly formed about the rotary shaft line A is attached to the rotary shaft 12. The seal member 25 is rotatable with the rotary shaft 12. The seal member 25 faces the rotary shaft 12 and has a predetermined thickness in the radial direction. The seal member 25 may tightly adhere to the rotary shaft 12. The seal member 25 faces the inner circumferential surface 23b of the surrounding portion 23a. The seal member 25 faces the inner circumferential surface 23b of the surrounding portion 23a in a state of barely having a gap (clearance) with respect to the surrounding portion 23a or having a very small gap. The seal structure of the present embodiment includes the rotary shaft 12, the surrounding portion 23a of the motor housing 3, and the seal member 25.

Figure 3A:
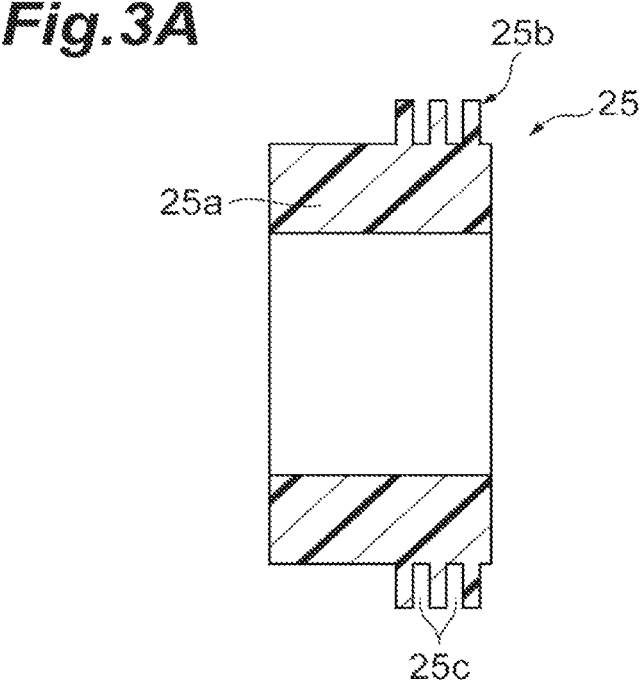
FIG. 3A is a cross-sectional view illustrating a seal member of the seal structure in FIG. 2.

The seal member 25 will be described in more detail. The seal member 25 is made of a resin. The seal member 25 may be formed of a PPS resin or may be formed of a PEEK resin, for example. The seal member 25 is formed of a material having hardness lower than that of a metal (for example, aluminum) forming the motor housing 3. As illustrated in FIGS. 2 and 3A, the seal member 25 includes a cylinder portion 25a which faces the rotary shaft 12, and a plurality of tonic portions 25b which protrude from the cylinder portion 25a toward the surrounding portion 23a. The number of toric portions 25b can be suitably set depending on the size or the like of the surrounding portion 23a. A plurality of groove portions 25c is provided between the plurality of tonic portions 25b. In this manner, the seal member 25 has a labyrinth structure (labyrinth shape).

The length of the cylinder portion 25a in the rotary shaft line A direction is longer than the range in which the toric portions 25b are provided. In other words, the seal member 25 includes the toric portions 25b within a range facing the surrounding portion 23a and protrudes to the compressor impeller 8 side beyond the surrounding portion 23a. In the cylinder portion 25a, no tonic portion 25b is formed at a part protruding to the compressor impeller 8 side beyond the surrounding portion 23a.

The cylinder portion 25a abuts the inner ring 20a of the bearings 20 and abuts the proximal end portion 8a of the compressor impeller 8. As illustrated in FIG. 1, the compressor impeller 8 and the seal member 25 are fixed to the rotary shaft 12 by a shaft end nut 16 provided in the distal end portion 12a of the rotary shaft 12. The boss portion 31 and the seal member 25 of the compressor impeller 8 receive a fastening force in the rotary shaft line A direction by the shaft end nut 16. The boss portion 31 and the seal member 25 are continuously provided in the rotary shaft line A direction. The diameter of the proximal end portion 8a of the boss portion 31 and the diameter of the cylinder portion 25a are substantially the same as each other. Accordingly, a tonic bonding surface B (refer to FIG. 2) corresponding to the diameters thereof is formed between the proximal end portion 8a and the cylinder portion 25a.

The seal member 25 may be deformed during a process of an operation of the electric turbocharger 1. More specifically, the clearance between the toric portions 25b constituting the outer circumferential portion of the seal member 25 and the inner circumferential surface 23b of the surrounding portion 23a is set to zero as the minimum value for working-dimensional tolerance of the components. If the clearance is set to zero, the seal member 25 comes into contact with the surrounding portion 23a while being abraded due to eccentricity or the like when the rotary shaft 12 rotates. As described above, the surrounding portion 23a is made of a metal. Due to this contact, the tonic portions 25b of the seal member 25 are easily chipped off. As a result, only a part of the tonic portions 25b in the circumferential direction is chipped off, so that the seal member 25 is deformed in its entirety. For example, a "part in the circumferential direction" is the outer circumferential portion on a side close to the surrounding portion 23a due to eccentricity. The deformation amount caused by the chipped-off seal member 25 varies depending on (the eccentric state of) each electric turbocharger 1. However, in each electric turbocharger 1, the seal member 25 is deformed (adjusted) to an optimal shape.

Therefore, the tonic portions 2511 of the seal member 25 include a part having the maximum outer diameter (a part which is not chipped off), and a part having an outer diameter smaller than the maximum part. The maximum outer diameter of the toric portions 25b of the seal member 25 (that is, an outer diameter in an initial stage before an operation starts) is approximately the same as the diameter of the inner circumferential surface 23b of the surrounding portion 23a. In other words, in a part of the maximum outer diameter of the seal member 25, the thickness (height) including the cylinder portion 25a and the toric portions 25b in the radial direction is approximately equal to the clearance between the rotary shaft 12 and the inner circumferential surface 23b of the surrounding portion 23a.

According to the seal structure of the present embodiment, the cylindrical seal member 25 is provided between the surrounding portion 23a and the rotary shaft 12 of the motor housing 3. This seal member 25 is fixed to the rotary shaft 12 and faces the surrounding portion 23a. When the rotary shaft 12 rotates, the seal member 25 rotates integrally with the rotary shaft 12. When eccentricity or the like is generated in the rotary shaft 12, the outer circumferential portion of the seal member 25 and the surrounding portion 23a may come into contact with each other due to the influence thereof. Since the surrounding portion 23a is made of a metal and the seal member 25 is made of a resin, in this case, the seal member 25 is easily chipped off. As a result, a bare minimum clearance is formed between the seal member 25 and the surrounding portion 23a. In this manner, sealing properties around the rotary shaft 12 are improved due to the simple configuration in which the resin-made seal member 25 is applied to the metal-made surrounding portion 23a. In addition, an appropriate clearance can be formed by operating the electric turbocharger 1 for a certain period of time. Therefore, there is no need to wastefully provide a clearance at the time of the initial stage. In addition, there is no need to provide the seal structure across a wide range in the rear surface portion of the compressor impeller 8 as in the labyrinth seal structure disclosed in Patent Literature 1. The seal member 25 need only be provided in a limited range between a part of the rotary shaft 12 and a part (surrounding portion 23a) of the motor housing 3, which is efficient in working.

For example, in a seal structure using a seal ring in the related art, there has been concern that the seal ring will wear when the seal ring attached to an attachment groove comes into contact with the housing due to eccentricity or the like at the time of rotation. An attempt at reducing the clearance in order to enhance the sealing properties results in a high possibility of contact and wear.

In the seal structure and the electric turbocharger 1 of the present embodiment, contact between the seal member 25 and the surrounding portion 23a is particularly utilized. However, since the seal member 25 is made of a resin and the surrounding portion 23a is made of a metal, such a situation is prevented. When the electric turbocharger 1 is assembled, the clearance between the diameter of the inner circumferential surface 23b of the surrounding portion 23a and the outer diameter (the maximum outer diameter described above) of the cylinder portion 25a is approximately zero, thereby being in a state in which the clearance is minimized as much as possible. Accordingly, a seal structure, in which leakage of gas or the like is reduced, is realized. In addition, a gap through which gas or the like may leak is reduced compared to a seal structure using the seal ring in the related art. Therefore, sealing is easily performed.

According to the seal member 25, when the rotary shaft 12 rotates, the distal ends of the tonic portions 25b and the surrounding portion 23a may come into contact with each other due to the influence of eccentricity or the like. The distal ends (parts in the circumferential direction) of the resin-made toric portions 25b are easily chipped off, and a bare minimum clearance is formed between the tonic portions 25b and the surrounding portion 23a. Accordingly, sealing properties are improved. In addition, when a labyrinth structure is constituted of the toric portions 25b and the groove portions 25c, sealing properties are further improved.

The seal structure described above is provided on the rear surface side of the compressor impeller. According to the electric turbocharger 1 including the seal structure described above, it is possible to minimize leakage of gas along the rotary shaft 12 on the rear surface side of the compressor impeller 8. As a result, for example, when the grease-lubricated bearing 20 is used, consumption of grease is minimized.

Since the compressor impeller 8 is made of a resin, even when the seal member 25 receives a pressure from the boss portion 31 of the compressor impeller 8 in the axial direction, deformation of the seal member 25 can be alleviated.

Hereinabove, the embodiment of the present disclosure has been described. However, the present disclosure is not limited to the embodiment described above. For example, when the compressor impeller 8 is made of a resin, the boss portion 31 of the compressor impeller 8 and the seal member 25 may be integrated by bonding or the like. When the compressor impeller 8 and the seal member 25 are formed of the same material, these may be formed as an integrally molded product. That is, the compressor impeller 8 may include the boss portion 31 which extends to the rear surface side of the compressor impeller 8 and is integrated with the seal member. In this case, the end portion of the boss portion 31 on the rotor portion 13 side becomes a seal member and is surrounded by the surrounding portion 23a. That is, the end portion of the boss portion 31 on the rotor portion 13 side faces the inner circumferential surface 23b of the surrounding portion 23a. Accordingly, the number of components can be reduced, and assembling is also easily performed.

Figure 3B:
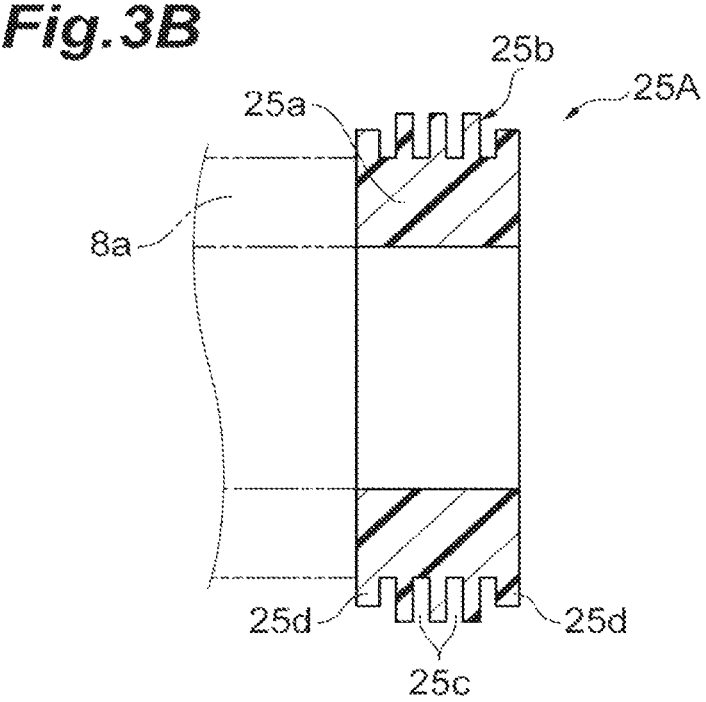
FIG. 3B is a cross-sectional view illustrating a seal member according to a modification example.

In addition, various forms may be employed as the shape of the seal member 25. For example, as illustrated in FIG. 3B, a seal member 25A, in which a flange portion 25d is provided on both or any one of the compressor impeller 8 (proximal end portion 8a) side and the bearing 20 (inner ring 20a) side, may be employed. The flange portion 25d is more significantly bulged than the diameter of the cylinder portion 25a. In addition, the thickness of the flange portion 25d in the rotary shaft line A direction is greater than the thickness of each of the tonic portions 25b. The flange portion 25d has strength greater than that of each of the tonic portions 25b.

In addition, a seal member having no tonic portion 25b (non-labyrinth structure) may be used. In such a case, the clearance between a cylindrical outer circumferential surface and the inner circumferential surface 23b of the surrounding portion 23a becomes zero. Accordingly, a part of the outer circumferential surface is chipped off in accordance with rotation of the rotary shaft 12.

In the embodiment described above, a case in which the compressor impeller 8 is made of a resin has been described. However, the compressor impeller 8 may be made of a metal such as aluminum. In such a case, the rotor in its entirety is reduced in weight due to the cylinder portion 25a of the seal member 25 protruding to the boss portion 31 side.

In the embodiment described above, a case in which the motor housing 3 in its entirety is made of aluminum has been described. However, the materials of the surrounding portion 23a and other parts may be different from each other.

Although the surrounding portion 23a is made of a metal, other parts may be formed of different materials.

Figure 4:
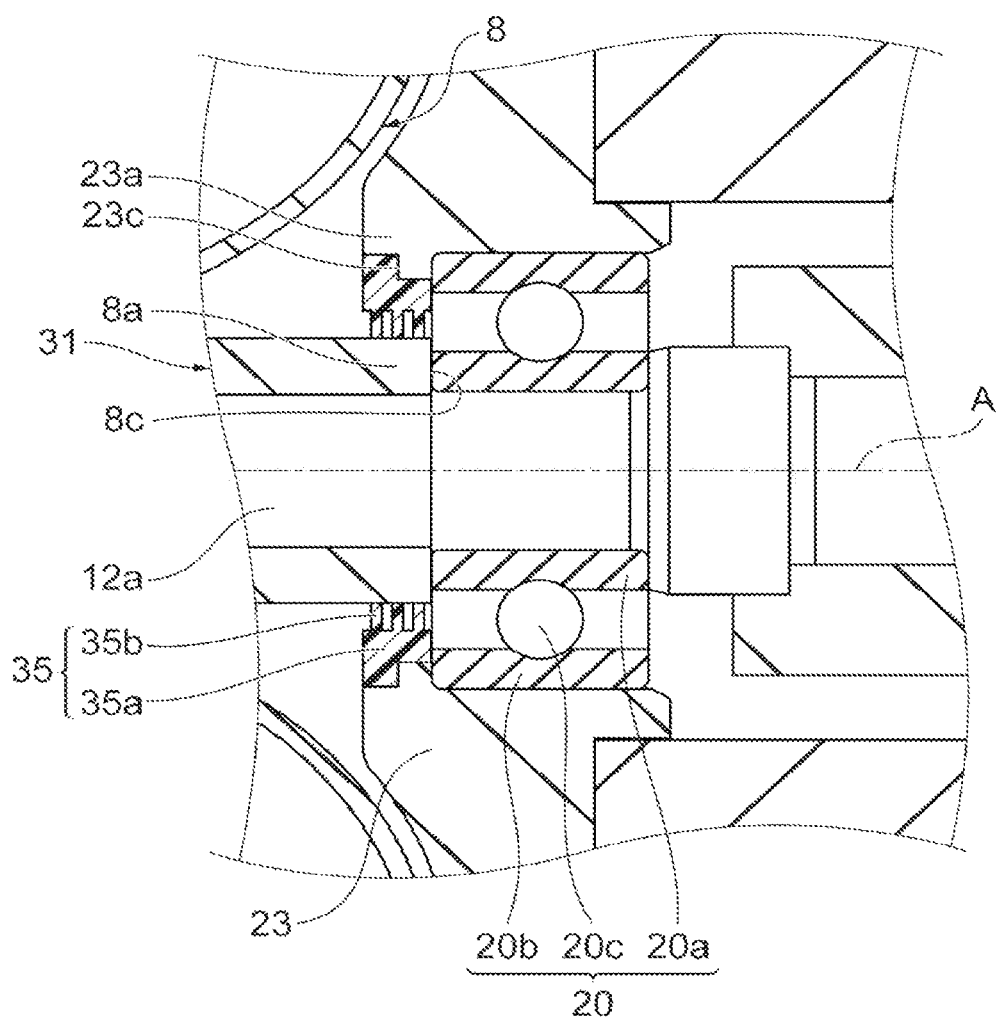
FIG. 4 is a cross-sectional view illustrating a seal structure in the vicinity of the rear surface side of the compressor impeller of a turbocharger according to another embodiment of the present disclosure.

With reference to FIG. 4, another embodiment of the present disclosure will be described. A seal structure illustrated in FIG. 4 differs from the embodiment illustrated in FIGS. 1 and 2 in including a seal member 35 which is attached to the inner circumferential surface of the surrounding portion 23a, in place of the seal member 25 which rotates together with the rotary shaft 12. In the embodiment described above, the seal member 25 is attached to the rotor side. In contrast, in the present embodiment, the seal member 35 is attached to a stationary portion side.

For example, the seal member 35 is fitted into a stepped portion 23c provided on the inner circumferential surface of the surrounding portion 23a. For example, the stepped portion 23c is formed between a part which abuts the outer ring 20b of the bearings 20, and a part which is formed on the compressor impeller 8 side of the foregoing part and has an inner diameter larger than the inner diameter of the foregoing part (that is, positioned outside in the radial direction). For example, the cylindrical proximal end portion 8a of the compressor impeller 8 (the proximal end portion 8a of the boss portion 31) extends to the bearings 20 and abuts the inner ring 20a of the bearings 20. An end surface 8c of the proximal end portion 8a abuts the inner ring 20a of the bearings 20.

The seal member 35 faces the cylindrical proximal end portion 8a (cylindrical portion) of the compressor impeller 8. The seal member 35 faces the outer circumferential surface of the proximal end portion 8a in a state of barely having a gap (clearance) with respect to the proximal end portion 8a of the compressor impeller 8 or having a very small gap. The seal structure of the present embodiment includes the rotary shaft 12, the proximal end portion 8a of the compressor impeller 8, the surrounding portion 23a of the motor housing 3, and the seal member 35.

The seal member 35 is made of a resin. For example, the seal member 35 may be formed of a PPS resin or may be formed of a PEEK resin. The seal member 35 is formed of a material having hardness lower than that of a material forming the compressor impeller 8 (the boss portion 31). The seal member 35 includes a tube portion 35a which is attached to the inner circumferential surface of the surrounding portion 23a, and a plurality of toric portions 35b which protrude from the tube portion 35a toward the proximal end portion 8a of the boss portion 31. The tube portion 35a has a stepped external shape corresponding to the stepped portion 23c of the surrounding portion 23a. The configuration of the plurality of toric portions 35b (the shape, the number, and the groove portions between the toric portions 35b) may be similar to the configuration of the seal member 25 of the embodiment described above. In this case, the seal member 35 has a labyrinth structure (labyrinth shape).

The seal member 35 may be deformed during a process of an operation of the electric turbocharger 1. More specifically, the clearance between the tonic portions 35b constituting the inner circumferential portion of the seal member 35 and the proximal end portion 8a of the compressor impeller 8 is set to zero as the minimum value for working-dimensional tolerance of the components. If the clearance is set to zero, the seal member 35 comes into contact with the proximal end portion 8a while being abraded due to eccentricity or the like when the rotary shaft 12 rotates.

It is possible to exhibit effects equivalent to those of the embodiment described above even by a seal structure including the seal member 35. For example, when the rotary shaft 12 rotates, the distal ends of the tonic portions 35b of the seal member 35 can come into contact with the proximal end portion 8a of the compressor impeller 8 due to the influence of eccentricity or the like. The distal ends of the resin-made tonic portions 35b are chipped off, and a bare minimum clearance is formed between the toric portions 35b and the proximal end portion 8a. Accordingly, sealing properties are improved.

In the seal structure including the seal member 35 described above, the seal member 35 may face another cylindrical portion. For example, the cylindrical proximal end portion 8a of the compressor impeller 8 (the proximal end portion 8a of the boss portion 31) does not have to extend to the bearings 20, and a different cylindrical portion may be disposed between the proximal end portion 8a and the bearings 20. In that case, the seal member 35 may face and come into contact with the different cylindrical portion. In addition, the seal member 35 may face and come into contact with the rotary shaft 12.

The present invention may be applied to an electric turbocharger of a type including a turbine and assisting rotation by means of a motor. The present invention may be applied to a general turbocharger other than the electric turbocharger. In addition, in a case in which a turbine is used for low-temperature gas, the present invention can be applied to a turbine impeller.

INDUSTRIAL APPLICABILITY

According to some aspects of the present disclosure, sealing properties around a rotary shaft can be improved due to a simple configuration in which a resin-made seal member is applied to a metal-made surrounding portion. In addition, sealing properties around a rotary shaft can be improved due to a simple configuration in which the resin-made seal member is attached to the surrounding portion.

REFERENCE SIGNS LIST

1 Electric turbocharger (turbocharger)
2 Housing
3 Motor housing
8 Compressor impeller
8a Proximal end portion (cylindrical portion)
12 Rotary shaft
20 Bearing
23a Surrounding portion
23b Inner circumferential surface
25, 25A Seal member
25a Cylinder portion
25b Toric portion
25c Groove portion
31 Boss portion
B Bonding surface

The invention claimed is:
1. A seal structure comprising:
a rotary shaft that is provided inside a housing;
a metal-made surrounding portion of the housing that surrounds the rotary shaft in a radial direction of the rotary shaft; and
a resin-made seal member that faces an inner circumferential surface of the surrounding portion and rotates together with the rotary shaft,
wherein the seal member includes a plurality of toric portions protruding toward the surrounding portion, and a groove portion is provided between the toric portions, and wherein during rotation of the rotary shaft, only a part of the toric portions in a circumferential direction is chipped off so as to form a clearance between the seal member and the surrounding portion.

2. A turbocharger comprising:

the housing that includes the surrounding portion;

a compressor impeller that is attached to the rotary shaft; and the seal structure according to claim 1 that is provided on a rear surface side of the compressor impeller inside the housing.

3. The turbocharger according to claim 2, wherein the compressor impeller is made of a resin and includes a boss portion which extends to the rear surface side of the compressor impeller and abuts the seal member.

4. The turbocharger according to claim 3, further comprising:

a grease-lubricated bearing that is provided on the rear surface side of the compressor impeller of the seal member.

5. The turbocharger according to claim 2, wherein the compressor impeller is made of a resin and includes a boss portion which extends to the rear surface side of the compressor impeller and is integrated with the seal member.

6. The turbocharger according to claim 5, further comprising:

a grease-lubricated bearing that is provided on the rear surface side of the compressor impeller of the seal member.

7. The turbocharger according to claim 2, further comprising:

a grease-lubricated bearing that is provided on the rear surface side of the compressor impeller of the seal member.

8. A seal structure comprising:

a rotary shaft that is provided inside a housing;

a surrounding portion of the housing that surrounds the rotary shaft in a radial direction of the rotary shaft; and a resin-made seal member that is attached to an inner circumferential surface of the surrounding portion and faces the rotary shaft or a cylindrical portion rotating together with the rotary shaft, wherein the seal member includes a plurality of toric portions protruding toward the surrounding portion, and a groove portion is provided between the toric portions, and wherein during rotation of the rotary shaft, only a part of the toric portions in a circumferential direction is chipped off so as to form a clearance between the seal member and the surrounding portion.

* * * * *